United States Patent [19]

Dickson-Simpson

[11] Patent Number: 4,470,748
[45] Date of Patent: Sep. 11, 1984

[54] DEMOUNTABLE VEHICLE BODY

[76] Inventor: John M. Dickson-Simpson, 19/20 Cowcross St., London, England, EC1M 6DQ

[21] Appl. No.: 286,109

[22] Filed: Jul. 22, 1981

[30] Foreign Application Priority Data

Jul. 30, 1980 [GB] United Kingdom ................ 8024940

[51] Int. Cl.³ .............................................. B60P 1/64
[52] U.S. Cl. ...................................... 414/498; 410/67
[58] Field of Search ................. 414/498, 499; 410/77, 410/78, 92, 67; 254/45, 49, 50; 298/12, 14, 15, 16; 296/35.3

[56] References Cited

U.S. PATENT DOCUMENTS

| 2,867,339 | 1/1959 | Nelson | 298/14 |
| 3,214,048 | 10/1965 | Terho | 414/499 |
| 3,469,723 | 9/1969 | Mathley et al. | 414/499 |
| 3,817,413 | 6/1974 | Ham | 414/498 |

FOREIGN PATENT DOCUMENTS

| 1531809 | 1/1970 | Fed. Rep. of Germany | 414/498 |
| 2610441 | 9/1977 | Fed. Rep. of Germany | 414/498 |
| 1123695 | 8/1968 | United Kingdom | |

Primary Examiner—Robert B. Reeves
Assistant Examiner—Donald Hajec
Attorney, Agent, or Firm—Richard T. Laughlin

[57] ABSTRACT

A demountable body and a transport vehicle therefor are disclosed. The body has front-body ramps and the vehicle has rear-chassis rollers. When the vehicle is reversed under the body, the ramps engage on the rollers and the front of the body is lifted. On further reversal, as the body approaches its mounted position, the front of the body is lowered by further front-body ramps rolling over front-chassis rollers or by front-body rollers rolling down front-chassis ramps. The rear of the body is lowered by a chassis lifting bridge or by the vehicle's suspension. The process of demounting is the reverse of the process of mounting.

10 Claims, 10 Drawing Figures

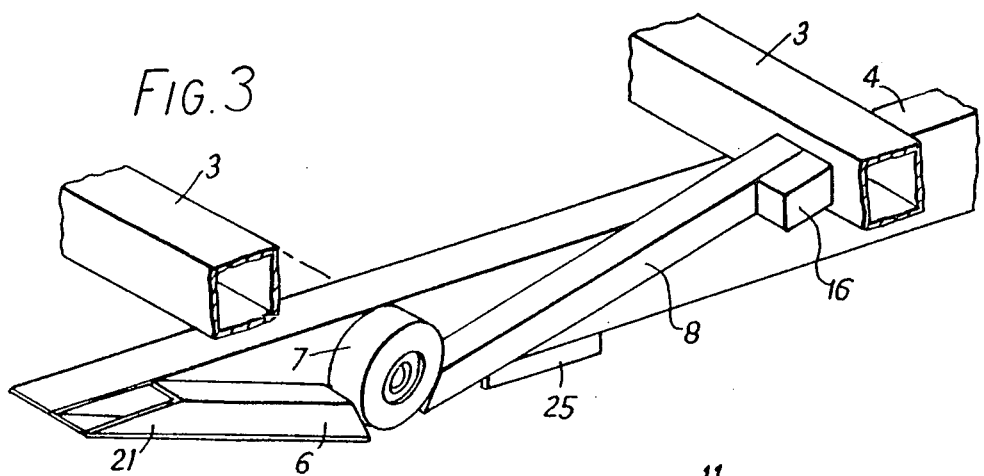
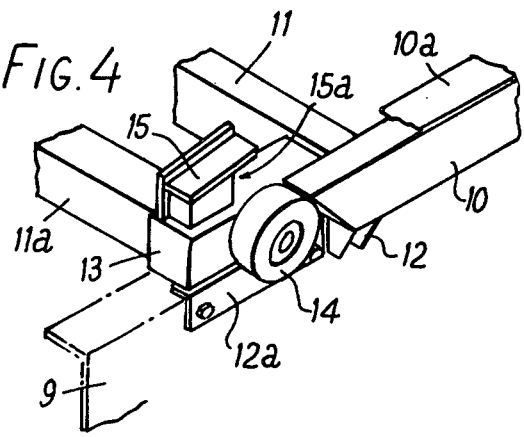
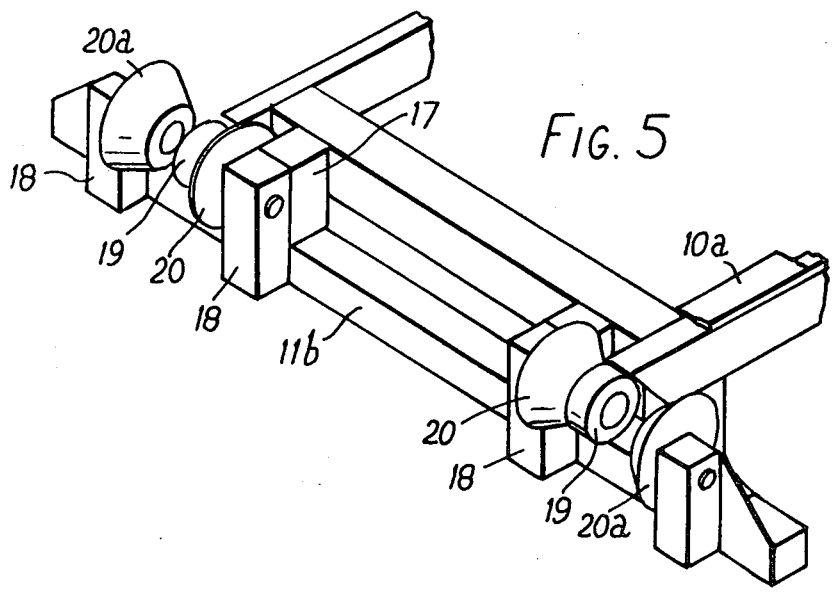

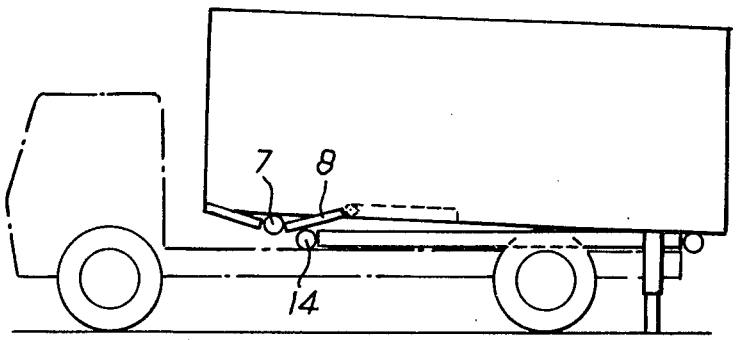
FIG.6(III)

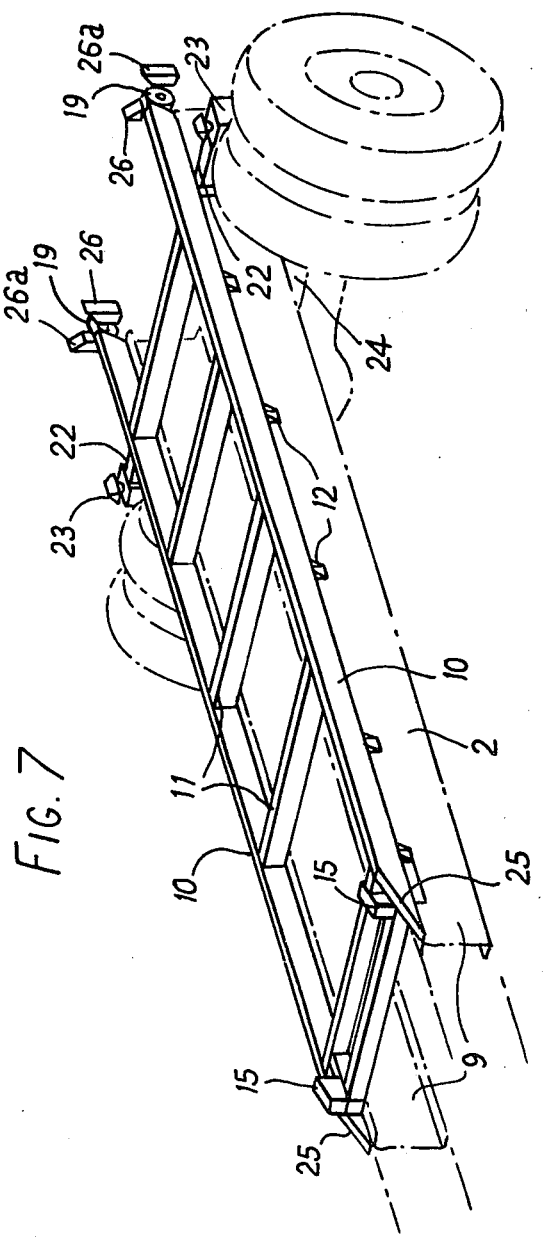

DEMOUNTABLE VEHICLE BODY

The present invention relates to a demountable body and a vehicle adapted therefor.

Demountable bodies are now widely used to enable bodies to be left for loading/unloading whilst the vehicle is being used elsewhere. Normally demountable bodies have four support legs. To pick up a body, the vehicle is reversed under it and, in one common arrangement with a ramp on the chassis, the vehicle raises the front of the body allowing the front legs to be retracted. Once the vehicle is right under the body the rear of the body is lifted, either by raising the vehicle on its suspension or by using a lifting jack on the vehicle, to allow the rear body legs to be retracted.

According to one aspect of the invention there is provided a demountable body and a transport vehicle therefor in combination wherein: the demountable body comprises at least one forward-facing, upwardly-inclined, front-body ramp mounted on the body in the vicinity of the front-bottom edge thereof and at least one front-body roller mounted on the body in the vicinity of the front-bottom edge thereof; the transport vehicle comprises at least one longitudinal rail mounted on the chassis of the vehicle and at least one rear-chassis roller mounted on the chassis at the rear end of the longitudinal rail or rails; the arrangement is such that when the vehicle is reversed under the body, the forward-facing, front-body ramp or ramps engage the rear-chassis roller or rollers whereby the body is lifted for engagement of the front-body roller or rollers on the longitudinal rail or rails.

According to another aspect of the invention there is provided a demountable body for use in the body and vehicle combination.

According to a third aspect of the invention there is provided a vehicle for use in the body and vehicle combination.

Usually a pair of chassis-mounted longitudinal rails is provided, one rail associated with each main chassis member. Each rail may be set inboard, outboard or on top of its chassis member. Where two longitudinal rails are provided, two front-body rollers are provided at the same track width. Preferably two forward-facing front-body ramps and two rear-chassis rollers are provided at this same track width, though it is quite possible for them to be provided at a different track width.

After initial lifting of the front of the body, by the front-body ramps passing over the rear-chassis rollers, further reversal of the vehicle brings the front-body rollers to the front of the rails. Preferably a pair of rearward-facing, upwardly-inclined, front-body ramps on the body and a pair of front-chassis rollers at the front end of the rails are provided for lowering the body onto the chassis during the final stages of mounting. An advantage of using rearward-facing body-ramps and front-chassis rollers for lowering the front of the body is that the height of the rails above the chassis member can be kept low. This, combined with arranging the rails to bear directly on cross members of the vehicle, keeps the centre of gravity of the body low on the vehicle which is advantageous for reasons of vehicle stability.

The two rearward-facing, front-body ramps and two front-chassis rollers are preferably provided at the same track width as that of the front-body rollers and the longitudinal rails. Where the same track width is used throughout, the rear- and front-chassis rollers are conveniently provided with their tops level with the longitudinal rails and the front-body rollers are conveniently provided at apices between the forward- and rearward-facing, front-body ramps. However where different widths are used, it is possible for the body ramps, and chassis rollers, to be at a quite different level from the body rollers, and longitudinal rails.

In an alternative embodiment, the front end of the longitudinal rails may be in the form of forward-facing, downwardly-inclined ramps down which the front-body rollers run for final lowering of the front of the body.

In the preferred embodiment, a pair of bolsters are provided on the chassis for engagement underneath the front of the body during the final lowering to restrain the body from further forward, lateral or vertical movement. Conveniently, the two bolsters are incorporated with the front end of the longitudinal rails. Advantages of using two bolsters are that they can be secured directly to the main chassis members and that they do not restrict the mounting of the body close to the cab of the vehicle in the way that a single central bolster may do where it has to be mounted behind the vehicle's engine and gearbox.

Preferably, at least one pair of tapered rollers is provided co-axially with the rear-chassis rollers for guiding the front-body ramps into initial alignment with the longitudinal chassis rails. Alternatively tapered guide surfaces may be provided. Preferably the front-body ramps extend in front of the body.

In the preferred embodiment a flange is provided at the front of the body for engaging the outer edge of each rail to maintain alignment as the chassis moves under the body. Alternatively, the front body rollers may be flanged. Another alternative is for the chassis rails to be flanged. Any, or all pairs of rollers can be replaced by skids to perform similar functions.

The longitudinal rails, rear- and front-chassis rollers and bolster units are conveniently pre-assembled for fitting to the vehicle as a single unit. As required, the unit may incorporate a lifting bridge or arm for body lifting to permit folding of the rear body legs. The unit may also incorporate means for locking the rear of the body to the chassis, usually container twist locks. Alternatively the body lifting may be done by varying the height of the chassis relative to its rear or both axles.

To help understanding of the invention, a specific embodiment thereof and a modification will now be described by way of example and with reference to the accompanying drawings in which:

FIG. 3 is a scrap view of the right hand side roller and ramp assembly on the body;

FIG. 4 is a scrap view of the left hand side front roller and bolster assembly on the chassis;

FIG. 5 is a scrap view of the rear roller assembly on the chassis;

Figure 2:
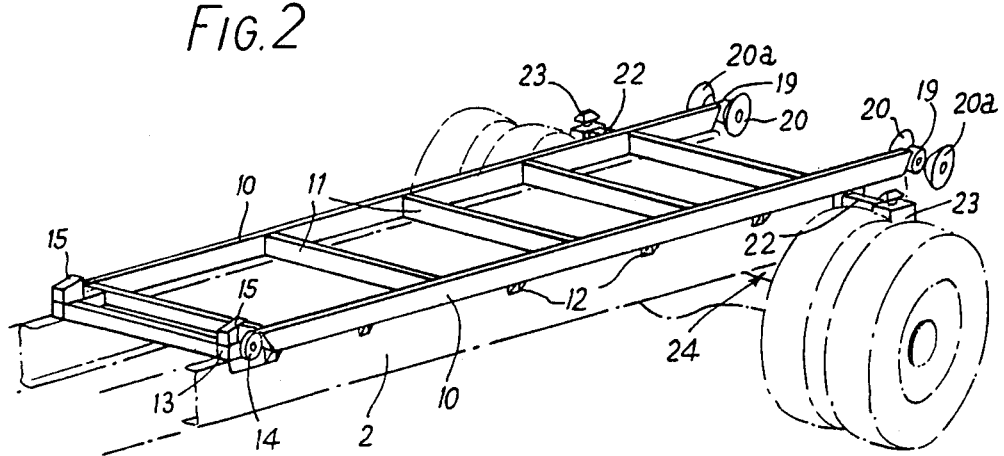
FIG. 2 is a perspective view from above of a vehicle chassis adapted to the body of FIG. 1.
Figure 6I:
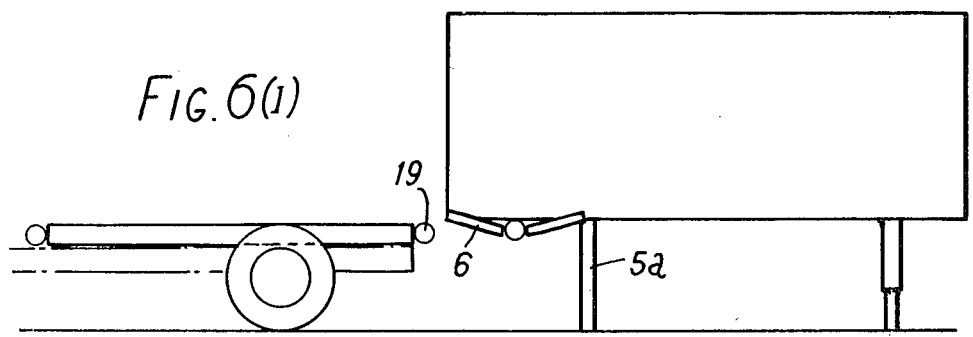
Figure 6:
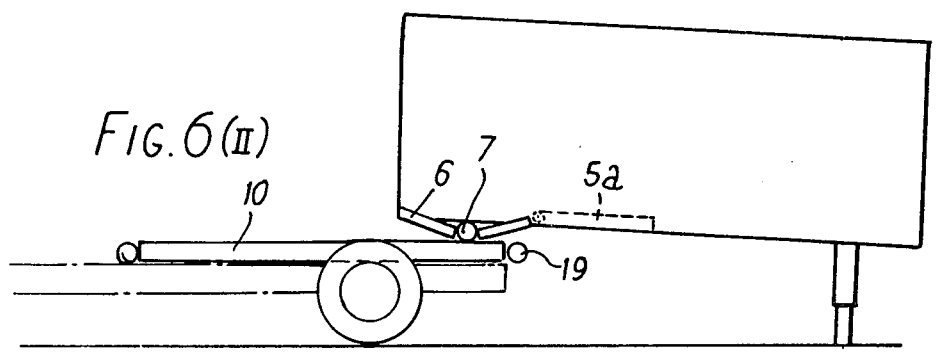
Figure 6:
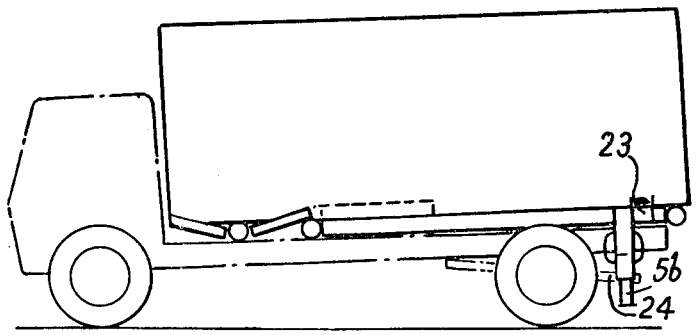

FIGS. 6(i), 6(ii) and 6(iii) and 6(iv) are a series of diagrams showing the process of mounting the body on the vehicle; and FIG. 7 is a view similar to FIG. 2 of another vehicle chassis.

Figure 1:
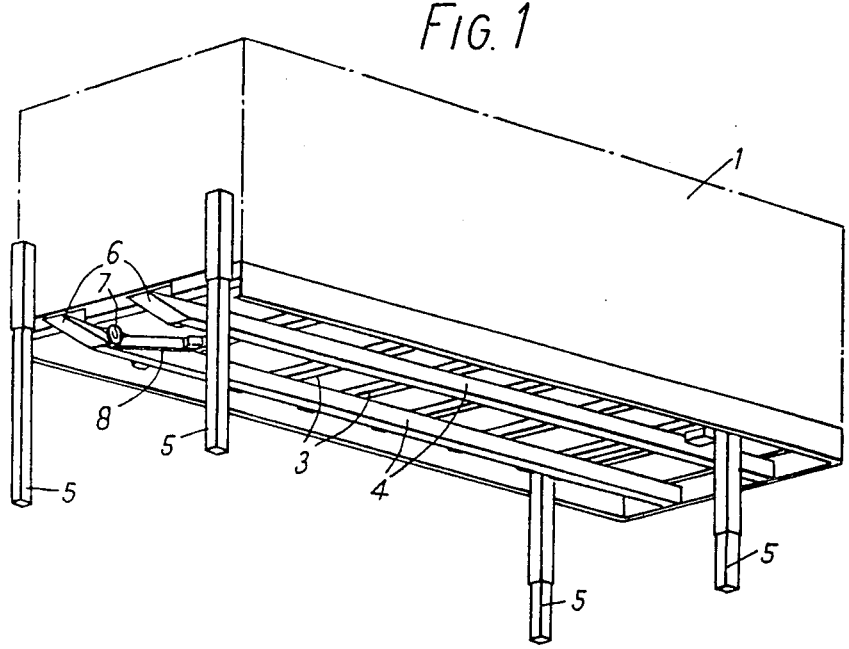
FIG. 1 is a perspective view from below of a demountable body in accordance with the invention.

Referring first to FIGS. 1 and 2, there can be seen in outline the arrangements for demountably mounting a body 1 on a vehicle chassis 2. The body is of conventional construction in having deck-supporting cross-members 3 attached to longitudinal main runners 4. In FIG. 1, the body's four support legs 5 are shown extended. Inside each runner at the front of the body is mounted a forward-facing, upwardly-inclined, front-body ramp 6, a front-body roller 7 and a rearward-facing, upwardly-inclined, front-body ramp 8. The runners 4 are laterally spaced to fit on the outside of the longitudinal rail 10. The forward facing, front body ramps 6 are formed as extensions of the longitudinal runners 4 and extend both forwardly and inwardly of the longitudinal runners. These can be seen in more detail in FIG. 3. They are in longitudinal alignment and the ramps are tangentially aligned with the roller.

On each main chassis member 9 is mounted a longitudinal rail 10, the two longitudinal rails being interconnected at intervals by cross-members 11 and bolted to the main chassis members via lugs 12. This rail sub-assembly is pre-assembled and then bolted to the chassis. Each longitudinal rail is a rectangular section rolled steel tube having a flat steel strip 10a welded on top to provide a bearing surface. At the front end of each rail, a support block 13, see FIG. 4, having its own cross-member 11a and bolting lug 12a and being welded to the rail, rotatably supports a front-chassis roller 14 in line with its rail 10. The top of the roller is level with the top of the rail bearing surface 10a. A bolster 15 is welded to the top of the block 13 and defines at its top inner sides and front a tapered space 15a into which a stub 16 welded adjacent the corresponding rearward-facing body ramp 8 can engage.

At the rear end of the rails, see FIG. 5, a rear cross-member 11b is supported below the rails by welded-on stub posts 17. The rear cross-member has additional posts 18 which rotatably support rear-chassis rollers 19 positioned in line with and having tops level with the rail bearing surfaces 10a. Fructoconical, tapered rollers 20 are rotatably supported co-axially with and inboard of the rollers 19, the small diameters ends of the tapered rollers 20 being the same diameter as and adjacent the rollers 19. Similar outer tapered rollers 20a having their small diameter ends inwards are spaced from the rollers 19 to provide space for the main body runners 4. It should be noted that the front of these runners is tapered off and carries a welded-on bearing surface steel strip 21 for the forward-facing, front-body ramps 6, these ramps extending beyond the front of the body, see FIG. 3.

In front of the rear-chassis rollers, the rails are equipped with out-riggers 22 carrying twist locks 23. The vehicle is equipped with rear axle air suspension 24.

FIG. 6 shows the process of mounting the body 1 on the vehicle chassis 2. In FIG. 6 (i), the vehicle is roughly lined up with the body. The vehicle is reversed and the forward-facing, front-body ramps 6 on the body engage the rear-chassis rollers 19. If the body is not exactly aligned, the ramps 6 will engage the tapered rollers 20 and be slewed into alignment. FIG. 6 (ii) shows the position where the ramps 6 have passed over the rollers 19, the front-body rollers 7 have also passed over the rollers 19 and onto the rails 10. The weight has been taken off the front body legs 5a which are retracted. The vehicle is reversed further. Alignment of the body is maintained by flanges 25 extending down from the body main runners adjacent the rearward-facing ramps 8, see FIG. 3, and by the main runners passing into the gap between the outer tapered rollers 20a and the chassis rear rollers 19. FIG. 6 (iii) shows the front-body rollers 7 having passed over the front-chassis rollers 14 and the latter rollers supporting the body via the rearward-facing ramps 8. When the body reaches its furthest forward point, the stubs 16 engage in the bolsters 15, see FIGS. 3 and 4 noting that FIG. 3 shows right hand side body detail and that FIG. 4 shows left hand side chassis detail. Thus the body is restrained from sideways, vertical and further forwards movement. FIG. 6 (iv) shows the rear of the chassis jacked up to take the weight off the rear body legs 5b which are retracted. It may be that the body main runners have not been engaged in the space by the tapered rollers 20a during reversing. Jacking up of the chassis will then bring the runners into the space, with initial sliding on the tapered rollers 20, if there is any mis-alignment. Once the chassis is lowered again, the twist locks 23 are operated to lock the body to the chassis with body crossmembers 3 bearing directly on the rail bearing surfaces 10a.

The above described embodiment of the invention has the advantage that the body comes to rest on the chassis in a low position with only the rails 10 between the chassis main members 9 and the crossmembers 3 of the body. Provision of the ramps on the body enables the rails to be supported directly by the chassis main members without spacers to allow for chassis ramps.

Further, provision of the two bolsters at the front of the rails provides both added stability in comparison with one central bolster and body location in a stronger and more convenient position.

The invention is not intended to be restricted to the details of the above described embodiment. For instance FIG. 7 shows a vehicle chassis wherein the front-chassis rollers 14 of FIG. 2 have been replaced by front-chassis ramps 25 and the tapered rollers 20, 20a have been replaced by laterally sloping surfaces 26, 26a. The body of FIG. 1 can be mounted on the vehicle chassis of FIG. 7, although the rearward-facing ramps 8 are unnecessary since the front of the body is lowered by the front-body rollers 7 rolling down the front-chassis ramps 25.

I claim:
1. A demountable body and a transport vehicle therefor in combination wherein:
  said demountable body comprises
  at least one forward-facing upwardly-inclined, front-body ramp mounted on said body in the vicinity of the front-bottom edge thereof and
  at least one front-body roller mounted on said body in the vicinity of the front-bottom edge thereof;
  said transport vehicle comprises
  at least one longitudinal rail mounted on the chassis of said vehicle and
  at least one rear-chassis roller mounted on the chassis at the rear end of said longitudinal rail or rails;
  the arrangement is such that, when said vehicle is reversed under said body, said forward-facing, front-body ramp or ramps engage said rear-chassis roller or rollers whereby said body is lifted for engagement of said front-body roller or rollers on said longitudinal rail or rails,
  said body includes
  at least one rearward-facing, upwardly-inclined, front-body ramp mounted in the vicinity of the front-bottom edge of said body;
  said vehicle includes
  at least one front-chassis roller mounted on the chassis at the front end of said longitudinal rail or rails;

the arrangement is such that, when said vehicle has continued to be reversed under said body until said front-body roller or rollers cleared the front end of said longitudinal rail or rails, said rearward-facing front-body ramp or ramps engage said front-chassis roller or rollers for lowering said body as said rearward-facing ramp or ramps roll down over said front-chassis roller or rollers.

2. The demountable body and a transport vehicle therefor in combination according to claim 1 wherein:
said demountable body comprises
at least one forward-facing upwardly-inclined, front-body ramp mounted on said body in the vicinity of the front-bottom edge thereof and
at least one front-body roller mounted on said body in the vicinity of the front-bottom edge thereof;
said transport vehicle comprises
at least one longitudinal rail mounted on the chassis of said vehicle and
at least one rear-chassis roller mounted on the chassis at the rear end of said longitudinal rail or rails;
the arrangement is such that, when said vehicle is reversed under said body, said forward-facing, front-body ramp or ramps engage said rear-chassis roller or rollers whereby said body is lifted for engagement of said front-body roller or rollers on said longitudinal rail or rails,
said vehicle includes
a forward-facing downwardly-inclined front-chassis ramp at the front end of said or each said longitudinal rail,
the arrangement being such that when said vehicle has continued to be reversed under said body until said front-body roller or rollers reached the front end or ends of said longitudinal rail or rails, said front-body roller or rollers engage said front-chassis ramp or ramps for lowering said body as said front-body roller or rollers roll down said front-chassis ramp or ramps.

3. The combination according to claim 1 wherein:
there is provided a pair each of:
said forward-facing front-body ramps,
said rearward-facing front-body ramps,
said front-body rollers,
said longitudinal rails,
said rear-chassis rollers and
said front-chassis rollers;
each said pair is spaced apart by an equivalent distance;
each of said longitudinal rails is mounted on its own main chassis member of said vehicle, and
said forward-facing ramps and said rearward-facing ramps are arranged to form a pair of apex-down Vees, each having a respective one of said front-body rollers at its apex.

4. The combination according to claim 3 wherein:
said body includes
a pair of stubs each mounted on said body in the vicinity of the front-bottom edge thereof;
said vehicle includes
a pair of bolsters, each said bolster being mounted on the chassis of said vehicle at the front end of its own said longitudinal rail, and each said bolster defining a space;
the arrangement is such that as said body is lowered by said front-body ramps rolling over said front-chassis rollers, each said stub engages in said space of its own bolster.

5. The combination according to claim 3 wherein:
said vehicle includes
a plurality of cross members interconnecting said longitudinal rails;
the arrangement being such that said longitudinal rails and said cross members form a sub-assembly, with said sub-assembly being secured to the chassis of said vehicle, and said rear-chassis rollers and said front-chassis rollers on said front-chassis ramps being included in said sub-assembly.

6. The combination according to claim 5 wherein said bolsters are included in said sub-assembly.

7. The combination according to claim 5 wherein said laterally centring means are included in said sub-assembly.

8. The combination according to claim 2 wherein:
there is provided a pair each of:
said forward-facing front-body ramps,
said front-body rollers,
said longitudinal rails,
said rear-chassis rollers and
said front-chassis ramps;
each said pair is spaced apart by an equivalent distance; and
each of said longitudinal rails is mounted on its own main chassis member of said vehicle.

9. The combination according to claim 1 wherein:
said vehicle includes
laterally centring means in the form of laterally-sloping surfaces mounted on the chassis adjacent said rear-chassis rollers, said laterally centring means including
at least one said laterally sloping surface which is upwardly inclined and faces towards one side of said vehicle and
at least one said laterally sloping surface or roller which is upwardly inclined and faces towards the other side of said vehicle;
the arrangement being such that said forward-facing, front-body ramps engage said laterally centering means prior to lifting of said body for lateral centring of the front of said body with respect to said vehicle.

10. A demountable body and a transport vehicle therefore in combination wherein:
said demountable body includes
at least one forward-facing upwardly-inclined, front-body ramp mounted on said body in the vicinity of the front-bottom edge thereof;
at least one front-body roller mounted on said body in the vicinity of the front-bottom edge thereof;
a pair of longitudinal runners laterally spaced to fit on the outsides of longitudinal rails, the rail are mounted on the chassis of said vehicle; and
a plurality of cross members fixed across and on top of said longitudinal runners and
said forward-facing, front-body ramps are formed as extensions of said longitudinal runners, extending both forwardly and inwardly of said longitudinal runners;
said vehicle includes
at least one rear-chassis roller mounted on the chassis at the rear end of said longitudinal rails;
the arrangement is such that, when said vehicle is reversed under said body, said forward facing, front body ramp engage said rear-chassis rollers whereby said body is lifted for engagement of said front-body rollers on said longitudinal rail;

laterally centring means on said vehicle comprising
a first pair of frustro-conical tapered rollers mounted coaxially with said rear-chassis rollers, tapering outwardly and having their small diameter ends both adjacent the insides of said rear-chassis rollers and the same diameter as said rear-chassis rollers, and
a second pair of frustro-conical tapered rollers mounted coaxially with said rear-chassis rollers, tapering inwardly and having both their small diameter ends both spaced outwardly from the outside of said rear-chassis rollers to define a gap for accommodating said longitudinal runners and the same diameter as said rear-chassis rollers;
the arrangement being such that, when said forward-facing front-body ramps are centred with respect to said rear-chassis rollers by engagement therewith, each said ramp extends from the respective one of said second pair of tapered rollers thereby bridging said gap and when said front-body rollers engage said longitudinal rails said longitudinal runners fit in said gap;
a forward-facing downwardly-inclined front-chassis ramp at the front end of said longitudinal rails;
the arrangement being such that when said vehicle has continued to be reversed under said body until said front-body rollers reach the front end of said longitudinal rail, said front-body rollers engage said front-chassis ramp for lowering said body as said front-body rollers roll down said front-chassis ramp;
at least one front-chassis roller mounted on the chassis at the front end of said longitudinal rails;
the arrangement is such that, when said vehicle has continued to be reversed under said body until said front-body roller or rollers cleared the front end of said longitudinal rail or rails, said rearward-facing front-body ramp or ramps engage said front-chassis roller or rollers for lowering said body as said rearward-facing ramp or ramps roll down over said front-chassis roller.

* * * * *